(12) United States Patent
Yamasaki

(10) Patent No.: US 7,334,278 B2
(45) Date of Patent: Feb. 26, 2008

(54) MOLDED POLYURETHANE FOAM PRODUCT, SEAT PAD FOR VEHICLE, AND METHOD FOR MOLDING POLYURETHANE FOAM PRODUCT

(75) Inventor: Koichiro Yamasaki, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 152 days.

(21) Appl. No.: 11/157,871

(22) Filed: Jun. 22, 2005

(65) Prior Publication Data
US 2005/0248203 A1 Nov. 10, 2005

Related U.S. Application Data

(63) Continuation of application No. PCT/JP03/16021, filed on Dec. 15, 2003.

(30) Foreign Application Priority Data
Dec. 24, 2002 (JP) .............................. 2002-372430
Mar. 14, 2003 (JP) .............................. 2003-070312

(51) Int. Cl.
*B29C 67/20* (2006.01)
(52) U.S. Cl. .................... 5/653; 5/740; 297/452.27; 264/46.1; 264/46.4
(58) Field of Classification Search ............. 5/653, 5/740; 297/452.26, 452.27; 264/46.1, 46.4
See application file for complete search history.

(56) References Cited

U.S. PATENT DOCUMENTS 4,190,697 A * 2/1980 Ahrens ..................... 428/309.9
4,405,681 A * 9/1983 McEvoy .................... 428/309.9
4,714,574 A * 12/1987 Tenhagen ................... 264/45.1
4,726,086 A * 2/1988 McEvoy ........................ 5/653
4,755,411 A * 7/1988 Wing et al. .................... 428/71
4,762,654 A * 8/1988 Fuchigami et al. .......... 264/45.1
4,837,881 A * 6/1989 Kondo et al. ................... 5/653
5,000,515 A * 3/1991 Deview .................... 297/452.27
5,944,389 A 8/1999 Kenba et al.
2002/0017733 A1 2/2002 Kobayashi et al.

FOREIGN PATENT DOCUMENTS

| EP | 0 822 116 A2 | 2/1998 |
|---|---|---|
| EP | 1 179 403 A2 | 2/2002 |
| JP | 6-75884 B2 | 9/1994 |
| JP | 10-33297 A | 2/1998 |
| JP | 10-94686 A | 4/1998 |
| JP | 3186060 B2 | 5/2001 |
| JP | 2002-200626 A | 7/2002 |
| JP | 2002-300936 A | 10/2002 |
| WO | WO 93/09934 A1 | 5/1993 |

* cited by examiner

*Primary Examiner*—Michael Trettel
(74) *Attorney, Agent, or Firm*—Sughrue Mion Pllc.

(57) ABSTRACT

At least two urethane stock solutions capable of forming polyurethane foam segments having different physical characteristics are charged into a mold and foamed under a predetermined molding pressure P to mold a one-piece polyurethane product including at least two molded portions having different physical characteristics. During the foaming step, the amounts of urethane stock solutions charged are determined so that the predetermined molding pressure P is obtained at any molded portion.

15 Claims, 3 Drawing Sheets

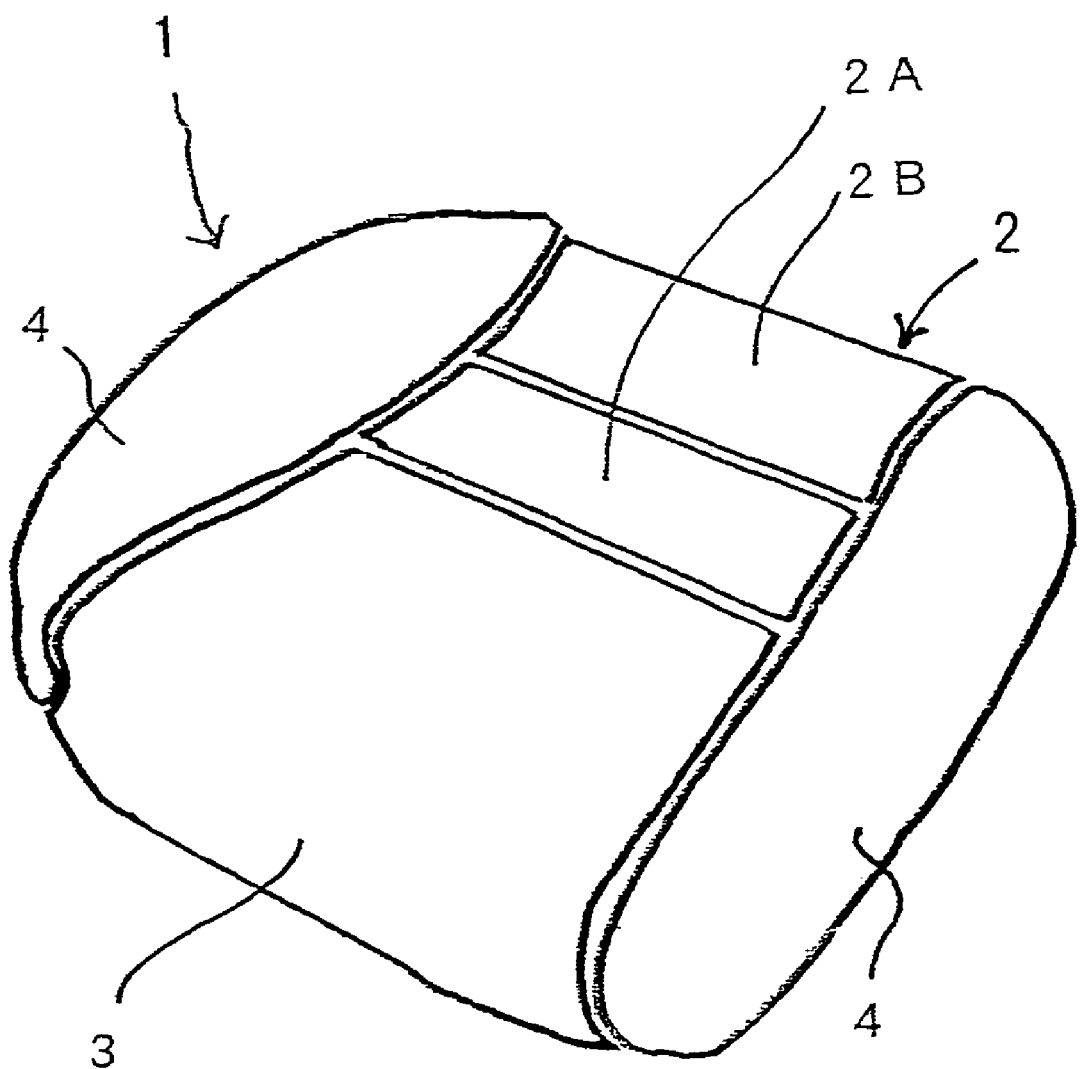

MOLDED POLYURETHANE FOAM PRODUCT, SEAT PAD FOR VEHICLE, AND METHOD FOR MOLDING POLYURETHANE FOAM PRODUCT

CROSS REFERENCE TO RELATED APPLICATION

This is a continuation application of PCT/JP03/16021 filed on Dec. 15, 2003.

FIELD OF THE INVENTION

The present invention relates to a molded polyurethane foam product, a seat pad for a vehicle, and a method for molding a polyurethane foam product. More particularly, the invention relates to a method for molding a one-piece polyurethane foam product, the polyurethane foam product partly having different physical characteristics, and relates to a molded polyurethane foam product and a seat pad for a vehicle manufactured by the method.

BACKGROUND OF THE INVENTION

Seat pads for vehicles such as automobiles have been generally formed of flexible or semirigid polyurethane foam segments. For the purpose of improving an occupant's comfort when seated while ensuring support stability and safety and for the purpose of reducing the feeling of fatigue due to a long-period of seating, cushioning properties, hardness, and vibration-absorbing properties have been improved by modifying the material or the structure.

As shown in FIG. 2, such a seat pad mainly includes an under-buttocks section 2, an under-thigh section 3, which are disposed at a seating portion, and side bulging sections 4 on both sides of the seating portion. The under-buttocks section 2 includes a base subsection 2A adjacent to the under-thigh section 3 and a rear-end subsection 2B.

Conventionally, such a seat pad 1 for a vehicle is generally produced by mixing a mixture containing a polyol component, a catalyst, a foaming agent, and other additives in predetermined proportions (hereinafter referred to as "polyol-containing solution") with an isocyanate component immediately before molding to prepare a urethane stock solution, and then injecting the resulting urethane stock solution into a mold to perform foam molding.

In the seat pad for a vehicle, the under-buttocks section 2 supports most of occupant's weight. The material constituting the under-buttocks section 2 has a close relationship to sitting comfort and riding comfort, and is thus important from the standpoint of the sitting comfort and riding comfort. However, the load due to body weight on portions other than the under-buttocks section 2 is low, and thus the level of importance of these portions is relatively low.

In a known seat pad for a vehicle, in some cases, the side bulging sections 4, the under-thigh section 3, and the like are partially composed of different materials. However, in general, the entire seat pad is composed of the same material. That is, the relatively less important portions other than the under-buttocks section 2 are composed of the same material as that used for the under-buttocks section 2, which is important from the standpoint of the sitting comfort and the riding comfort. Therefore, this causes an increase in weight and cost.

A reduction in vehicle weight for achieving higher fuel-efficiency is an important issue for the automobile industry. Furthermore, lower cost is always desired.

To achieve a reduction in the weight of the seat pad, it is proposed that the portions other than the under-buttocks section of the seating portion are formed of a polyurethane foam segment having lower density and higher impact resilience, compared with those of a polyurethane foam segment constituting the under-buttocks section. In such a seat pad, the portions other than the under-buttocks section are composed of a material having low-density, thereby achieving a reduction in weight. The low-density material has high impact resilience, thereby improving sitting comfort and durability.

However, such a polyurethane form having high impact resilience and low density is expensive. Thus, constituting the portions other than the under-buttocks section with the polyurethane foam segment having low density and high impact resilience has a cost disadvantage.

In the seat pad for a vehicle, load on the portions other than the under-buttocks section is low. Thus, the portions other than the under-buttocks section are not always required to be composed of a material having high impact resilience from the viewpoint of riding comfort and durability.

As a seat pad for a vehicle achieving reductions in weight and cost without deterioration of sitting comfort, riding comfort, and durability, the present inventor proposed a seat pad in which the portions other than the under-buttocks section of the seating portion are partly or wholly composed of a material having lower density and substantially the same hardness, compared with a material constituting the under-buttocks section (see Japanese Unexamined Patent Application Publication No. 2002-353102). As described above, load on the portions other than the under-buttocks section is low. Therefore, when the material constituting the portions other than the under-buttocks section has substantially the same hardness as that of the material constituting the under-buttocks section, even if the portions other than the under-buttocks section are composed of a low-density and inexpensive material, satisfactory performance can be obtained, from the viewpoint of the sitting comfort, the riding comfort, and the durability.

Conventionally, a method for molding a one-piece polyurethane foam product by injecting at least two urethane stock solutions into a mold at the same time or with time differences has been performed. If a seat pad for a vehicle including portions having different densities and substantially the same hardness disclosed in Japanese Unexamined Patent Application Publication No. 2002-353102 can be molded in one piece, productivity can be significantly improved, thus reducing production cost.

Conventionally, such a molded polyurethane foam product including portions having different densities and substantially the same hardness has not been molded in one piece. A polyurethane foam product partly having different physical characteristics, in particular, a molded polyurethane foam product including a molded section having a desired density, as designed, at a desired position, has not been molded in one piece.

Conventionally, when one-piece molding has been performed with at least two urethane stock solutions having different compositions, the one-piece molding has been performed by injecting the urethane stock solutions into a mold without consideration of molding pressure during one-piece molding (maximum internal pressure reached in a mold during foam molding). Thus, even when one-piece molding was performed by injecting at least two urethane stock solutions capable of forming polyurethane foam segments having different physical characteristics into a mold under a predetermined pressure P, it was not possible to form portions having target physical characteristics.

SUMMARY OF THE INVENTION

Accordingly, it is an object of the present invention to provide a method for surely molding a polyurethane foam product partly having different physical characteristics, and to provide a molded polyurethane foam product and a seat pad for a vehicle produced by the method.

A method for molding a polyurethane foam product according to the present invention includes the steps of injecting a urethane stock solution containing a polyol-containing solution and an isocyanate component into a mold and foaming the stock solution. Specifically, according to the inventive method, a polyurethane foam product including at least two molded portions having different physical characteristics is molded by injecting at least two urethane stock solutions capable of forming polyurethane foam segments having different physical characteristics into the mold and then foaming the stock solutions at a predetermined molding pressure P. In the present invention, the at least two urethane stock solutions are injected into the mold and foamed so that any molded portion has the predetermined molding pressure P during foaming step.

In the present invention, the urethane stock solutions are injected so as to obtain a predetermined molding pressure P at any portion during the foaming step. Thus, the molded portions having target physical characteristics can be surely formed.

In an aspect of the present invention, the one-piece polyurethane foam product including a first molded portion having a predetermined density and a second molded portion having a density different from that of the first molded portion is molded by injecting at least two urethane stock solutions capable of forming polyurethane foam segments having different densities into the mold and then foaming the urethane stock solutions at the predetermined molding pressure P.

In a preferred embodiment of the present invention, the amounts of urethane stock solutions injected are determined so that any molded portion has the predetermined molding pressure P during foaming step, based on the densities of the polyurethane foam segments formed with the urethane stock solutions at the predetermined molding pressure and the volumes of molded portions formed with the respective urethane stock solutions. The resulting polyurethane foam product partly having different densities and substantially the same hardness is particularly suitable for a seat pad for a vehicle.

The inventive polyurethane foam product and seat pad for a vehicle are produced by the inventive method.

In the inventive seat pad for a vehicle, preferably, portions other than an under-buttocks section of a seating portion of the seat pad partly or wholly have a density lower than that of the under-buttocks section and have the same hardness as that of the under-buttocks section.

In the present invention, the term "density" refers to "overall (total) density (OA density)". The OA density is determined by dividing the foam weight of a seat pad for a vehicle by the foam volume. The term "hardness" refers to "25% hardness". The 25% hardness is determined by compressing a seat pad for a vehicle until the thickness of the seat pad decreases to 25% of the original thickness using a pressure plate 200 mm in diameter.

BRIEF DESCRIPTION OF THE DRAWINGS

FIG. 2 is a perspective view of a typical seat pad for a vehicle;

DESCRIPTION OF THE PREFERRED EMBODIMENTS

Embodiments of the present invention will be described in detail with reference to the drawings.

Figure 1A:
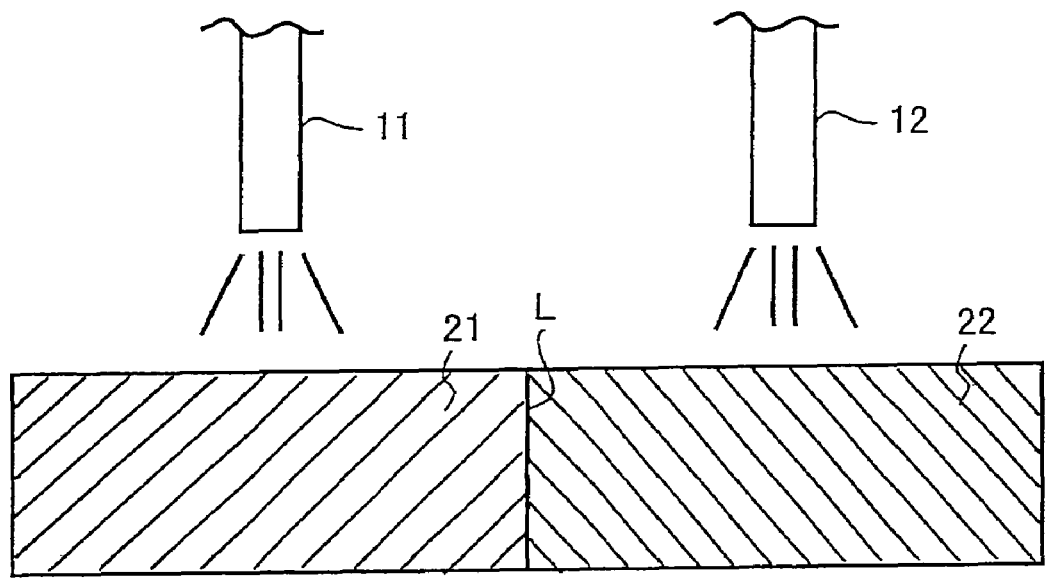
FIGS. 1A and 1B each are a schematic cross-sectional view of a method for molding a polyurethane foam product according to an embodiment of the present invention.
Figure 1B:
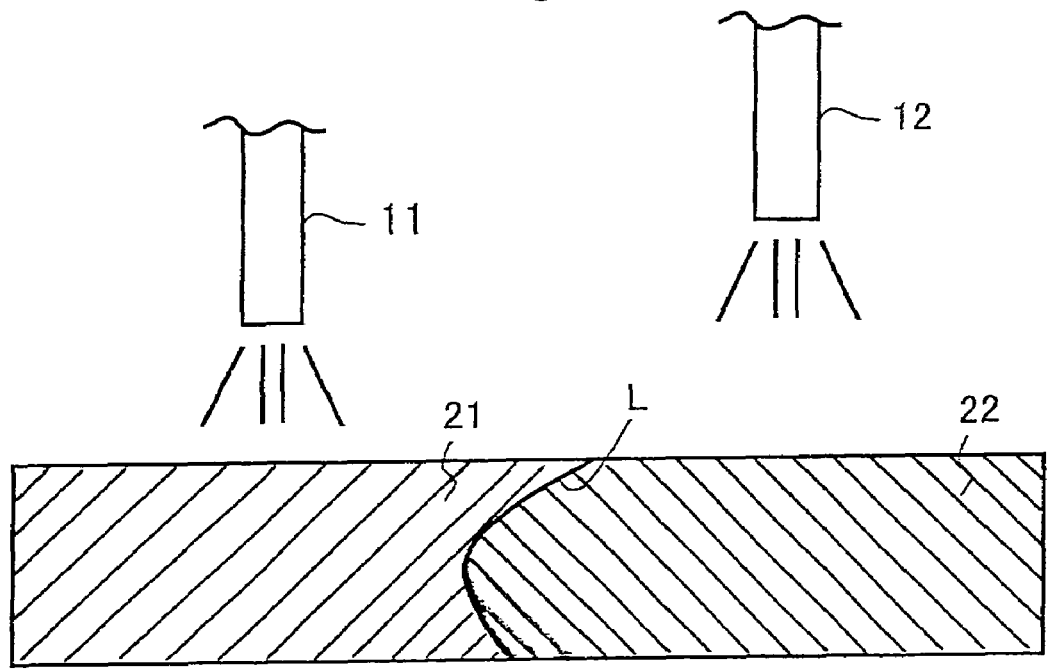

FIGS. 1A and 1B each are a schematic cross-sectional view of a method for molding a polyurethane foam product according to an embodiment of the present invention.

As described below, under a predetermined molding pressure P, i.e., under the same foam pressure P, a method for molding a polyurethane foam product partly having different densities and substantially the same hardness by injecting two urethane stock solutions capable of forming polyurethane foam segments having different densities and substantially the same hardness into a mold and then foaming them, will be described. However, it is to be understood that, in the present invention, at least three such poly urethane stock solutions may be used. Furthermore, in the present invention, under a predetermined molding pressure P, a polyurethane foam product partly having different densities, other physical properties, and characteristics may be molded by injecting two or three or more urethane stock solutions capable of forming polyurethane foam segments having different hardness, impact resilience, and vibration characteristics in addition to different densities and then foaming them.

In the present invention, as shown in FIG. 1A, such two urethane stock solutions may be injected through injection nozzles 11 and 12. Alternatively, as shown in FIG. 1B, one of such two urethane stock solutions may be injected through the injection nozzle 12 at a predetermined time after injecting another urethane stock solution through the injection nozzle 11.

In each case, by injecting two the urethane stock solutions into a mold, a polyurethane foam product including a first molded portion 21 formed of a polyurethane foam segment having hardness $H_1$ and density $D_1$ and a second molded portion 22 formed of a polyurethane foam segment having hardness $H_2$ and density $D_2$ is molded in one piece. The hardness $H_1$ of the first molded portion 21 is substantially the same as the hardness $H_2$ of the second molded portion 22. The density $D_1$ of the first molded portion 21 is different from the density $D_2$ of the second molded portion 22.

In the present invention, the term "substantially the same hardness" means that the hardness difference is 20 N or less, in particular, 0 to 4.9 N. The term "different densities" mean that the density difference is 3 kg/m$^3$ or more, in particular, about 10 to 50 kg/m$^3$.

When two urethane stock solutions are injected into a mold at the same time, as shown in FIG. 1A, a polyurethane foam product partly having the same hardness and different densities can be molded, the interface L between the first molded portion 21 and the second molded portion 22 being substantially in the same plane.

When two urethane stock solutions are injected into a mold with a time difference, as shown in FIG. 1B, a polyurethane foam product partly having the same hardness and different densities can be produced in the same way as the simultaneous injection, the interface L between the first molded portion 21 and the second molded portion 22 slightly deviating from the same plane. In this way, when two urethane stock solutions are injected into a mold with a time difference, before one urethane stock solution that has been injected is resinified (cured), it is necessary to inject another urethane stock solution into the mold.

A method for preparing two urethane stock solutions capable of forming polyurethane foam segments including first and second molded portions having different densities and substantially the same hardness will be described below.

The density of polyurethane foam segment molded is mainly determined by the amount of water functioning as a foaming agent contained in a polyol-containing solution in a urethane stock solution.

In preparation of the urethane stock solution, the water content in the polyol-containing solution is adjusted, and the relationship between the molding pressure (maximum internal pressure) and the OA density of each of the two urethane stock solutions is determined (see FIG. 3A) as shown in Example 1 described below. The compositions of the two urethane stock solutions capable of forming polyurethane foam segments having different OA densities and a target OA-density difference at the same maximum internal pressure are determined. In other words, at the same maximum internal pressure, the compositions of a urethane stock solution for forming a polyurethane foam segment having a higher density (hereinafter referred to as "high-density urethane stock solution") and a urethane stock solution for forming a polyurethane foam segment having a lower density (hereinafter referred to as "low-density urethane stock solution") are determined. In this case, at the same maximum internal pressure, the densities of first and second molded portions formed with the high-density urethane stock solution and the low-density urethane stock solution, respectively, are defined as $D_H$ and $D_L$, respectively ($D_H > D_L$).

With respect to the high-density urethane stock solution and the low-density urethane stock solution, as described in Example 1, the relationship between the OA density and 25% hardness (see FIG. 3B) is determined. For example, the isocyanate index of the high-density urethane stock solution is adjusted so that the 25% hardness of the first molded portion having a density of $D_H$ formed with the high-density urethane stock solution is substantially equal to that of the second molded portion having a density of $D_L$ formed with the low-density urethane stock solution. This adjustment should be performed by, for example, adjusting the mixing ratio of the isocyanate component to the polyol-containing solution. The relationship between the density and the maximum internal pressure of the first molded portion molded with the high-density urethane stock solution is little changed by the adjustment. Therefore, the compositions of the high-density urethane stock solution and the low-density urethane stock solution capable of forming the first and second molded portions, respectively, having the same hardness and different densities can be determined at the same maximum internal pressure.

The isocyanate index of the low-density urethane stock solution may be adjusted so that the 25% hardness of the first molded portion having a density of $D_H$ formed with the high-density urethane stock solution is substantially equal to that of the second molded portion having a density of $D_L$ formed with the low-density urethane stock solution.

The above-description is an example of a method for preparing two urethane stock solutions having the same foam pressure and capable of forming polyurethane foam segments having different densities, and does not limit the method for preparing a urethane stock solution according to the present invention.

A method for determining the amounts of the resulting high-density urethane stock solution and low-density urethane stock solution injected will be described below.

When these polyurethane foam portions are molded with the high-density urethane stock solution and the low-density urethane stock solution, the amounts of these solutions injected are determined so that the same predetermined maximum internal pressure is obtained at these molded portions. The amount of high-density urethane stock solution injected $G_H$ is determined from the volume $V_H$ and the density $D_H$ of the portion molded with the high-density urethane stock solution at the maximum internal pressure. The amount of low-density urethane stock solution injected $G_L$ is determined from the volume $V_L$ and the density $D_L$ of the portion molded with the low-density urethane stock solution. In other words, a value obtained by dividing the volume of each injected urethane stock solution by the volume of corresponding molded portion corresponds to the density of the molded polyurethane foam segment. Thus, the amount of urethane stock solution injected can be determined from the product of the density and the volume of the molded portion. That is, the amounts of high-density urethane stock solution $G_H$ and low-density urethane stock solution $G_L$ injected are determined according to the following equations:

$$G_H = V_H \cdot D_H$$

$$G_L = V_L \cdot D_L$$

Conventionally, in order to form a polyurethane foam segment having a predetermined density, as described above, the amount of urethane stock solution injected has been determined from the volume of the portion molded and the target density. However, conventionally, when a one-piece polyurethane foam product is molded with at least two urethane stock solutions, the foam pressures, i.e., the maximum internal pressures, of respective polyurethane foam portions are different in molding the polyurethane foam portions having the target density. That is, the amount of each urethane stock solution injected is determined from the density and the volume of the molded portion at an arbitrary internal pressure. Consequently, in actual one-piece molding, an internal pressure needed for forming a portion having a density used for the calculation of the amount of urethane stock solution injected is not always achieved. As a result, a molded portion having a target density cannot be produced.

In the present invention, the densities of portions molded at the same molding pressure P are determined from the relationship between the molding pressure and the density. The amounts of urethane stock solutions injected are determined so that these densities are obtained. Thus, in one-piece molding, the molding pressures at any molded portion in a mold are the same pressure P. As a result, it is possible to surely produce a polyurethane foam product including a molded portion having a target density.

Examples of such a one-piece polyurethane foam product including at least two molded portions having different physical characteristics produced by the method according to the present invention include, but are not limited to, the above-described polyurethane foam product including the molded portions having the same hardness and different densities, a polyurethane foam product including the molded portions having different hardness and densities, a polyurethane foam product including the molded portions having different densities and substantially the same impact resilience, a polyurethane foam product including the molded portions having different densities and substantially the same vibration characteristics, and a polyurethane foam product including the molded portions having the same density and different hardness.

In the present invention, at least two urethane stock solutions capable of forming polyurethane foam segments having different physical characteristics at a predetermined molding pressure P are injected in amounts such that the predetermined molding pressure P is obtained at any portion molded with these stock solutions, thereby molding a one-piece polyurethane foam product including at least two molded portions having different physical characteristics.

An inventive seat pad for a vehicle includes portions preferably having the same hardness and different densities molded by such a method according to the present invention.

Specific examples of the configuration of the inventive seat pad for a vehicle include the following, but are not limited to:

(i) an under-buttocks section 2 and an under-thigh section 3 are formed of high-density polyurethane foam segments, and the other portions (side bulging sections 4) are formed of low-density polyurethane foam segments; and (ii) the under-thigh section 3 and a base subsection 2A of the under-buttocks section 2 are formed of high-density polyurethane foam segments, and the other portions (rear-end subsection 2B and side bulging sections 4) are formed of low-density polyurethane foam segments.

Since only limited portions including the under-buttocks section 2 are formed of high-density polyurethane foam segments and the other portions, which little affect sitting comfort and durability, are formed of low-density polyurethane foam segments, it is possible to reduce the weight of the entire seat pad for a vehicle. The hardness of the portions having low densities is the same as that of the portions having high densities, and other physical characteristics, such as impact resilience, of the portions having low densities are low level; hence, it is possible to reduce the material cost of the seat pad for a vehicle.

In the inventive seat pad for a vehicle, the density of the portion having a high density formed with the high-density urethane stock solution is preferably about 40 to 80 kg/m³ in order to ensure sitting comfort, riding comfort, durability, and the like. The 25% hardness is preferably about 150 to 300 N.

The density of the portion having a low density formed with the low-density urethane stock solution is preferably about 40% to 95% of that of the portion having a high density formed with the high-density urethane stock solution. Preferably, the hardness is substantially the same as that of the portion having a high density.

The inventive seat pad for a vehicle, in which the portion having a low density have substantially the same hardness as that of the portion having a high density, is reduced in weight without deterioration of riding comfort and durability. The hardness difference between the portion having a low density and the portion having a high density is preferably 4.9 N or less, more preferably 3 N or less, and most preferably 2 N or less.

In the inventive seat pad for a vehicle, at least the entire under-buttocks section or at least the base subsection 2A is constituted of the polyurethane foam segment formed with the high-density urethane stock solution, and the other sections are partly or wholly constituted of the polyurethane foam segments formed with the low-density urethane stock solution.

To achieve satisfactory reductions in weight and cost without deterioration of sitting comfort, riding comfort, durability, and the like, 20% to 70% of the total volume of the seat pad for a vehicle is preferably constituted of the polyurethane foam segment formed with the high-density urethane stock solution, the remainder is preferably constituted of the polyurethane foam segment formed with the low-density urethane stock solution.

In the inventive seat pad for a vehicle, the impact resilience of the entire under-buttocks section or the base subsection is preferably 65% to 78% and particularly preferably 65% to 70%. The impact resilience of the other sections is preferably 62% or less, more preferably 50% to 62%, and most preferably 60% to 62%. In this way, by increasing the impact resilience of the entire under-buttocks section or the base subsection and reducing the impact resilience of the other sections, it is possible to satisfactorily stretch the upholstery covering the seat pad for a vehicle.

The inventive seat pad for a vehicle is not limited to the seat pad consisting of two portions, which are the high-density portion and the low-density portion. In the inventive seat pad, a portion having substantially the same hardness and having the intermediate density between those of the high-density portion and the low-density portion may be disposed at a section other than the under-buttocks section.

EXAMPLES

The present invention will be described in detail based on examples.

Example 1

Urethane stock solution A and urethane stock solution B were prepared as described below. The isocyanate index of the urethane stock solution A was 36, and the isocyanate index of the urethane stock solution B was 41.

TABLE 1

| Composition of urethane stock solution A (part by weight) | |
| --- | --- |
| Polyether polyol | 58.0 |
| Polymer polyol | 40.0 |
| Cross-linking agent | 2.0 |
| Triethylenediamine (made by Sankyo Air Products Co., Ltd.) | 0.5 |
| L-5309 (made by Dow Corning Toray Co., Ltd.) | 0.5 |
| Water | 3.1 |
| TDI | 36 |

TABLE 2

| Composition of urethane stock solution B (part by weight) | |
| --- | --- |
| Polyether polyol | 47.0 |
| Polymer polyol | 50.0 |
| Cross-linking agent | 3.0 |
| Triethylenediamine (made by Sankyo Air Products Co., Ltd.) | 0.5 |
| L-5309 (made by Dow Corning | 0.1 |

TABLE 2-continued

Composition of urethane stock solution B
(part by weight)

| Toray Co., Ltd) | |
|---|---|
| Water | 3.6 |
| TDI | 41 |

Figure 3A:
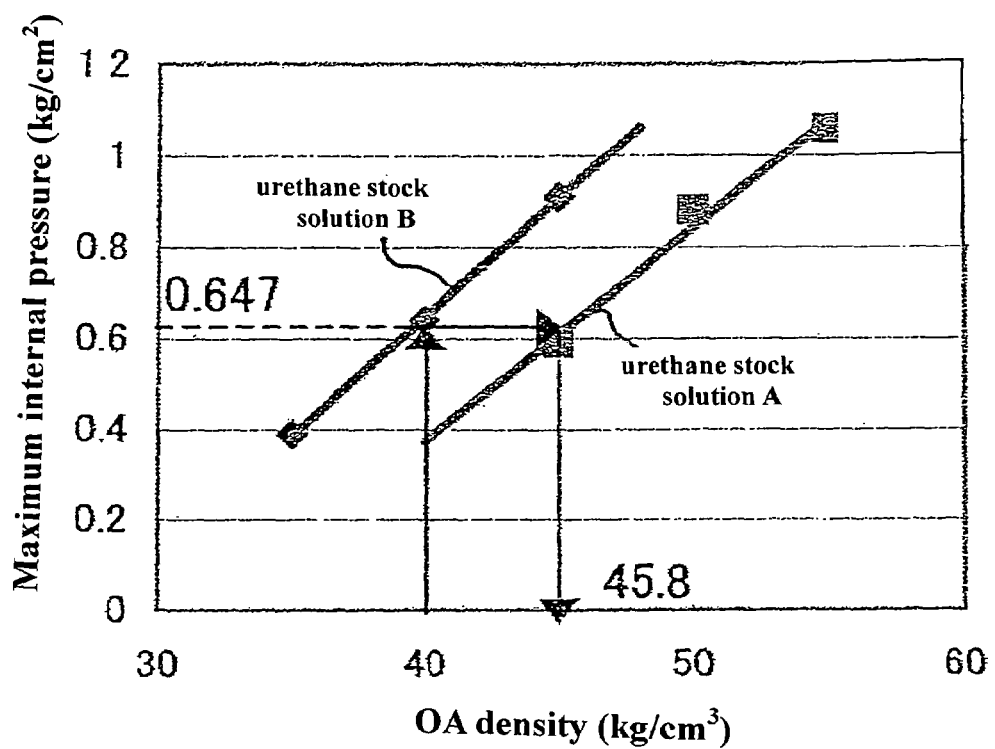
FIG. 3A is a graph showing the relationship between the OA density and the maximum internal pressure with respect to urethane stock solution A and urethane stock solution B in Example 1.

With respect to each of the urethane stock solution A and the urethane stock solution B, the relationship between the OA density and the maximum internal pressure was investigated. FIG. 3A shows the results. When internal pressure P was 0.647 kg/cm² (63.4 kPa), the OA density of the polyurethane foam segment formed with the urethane stock solution A was 45.8 kg/m³, and the OA density of the polyurethane foam segment formed with the urethane stock solution B was 40 kg/m³. That is, these polyurethane foam segments had different densities.

Figure 3B:
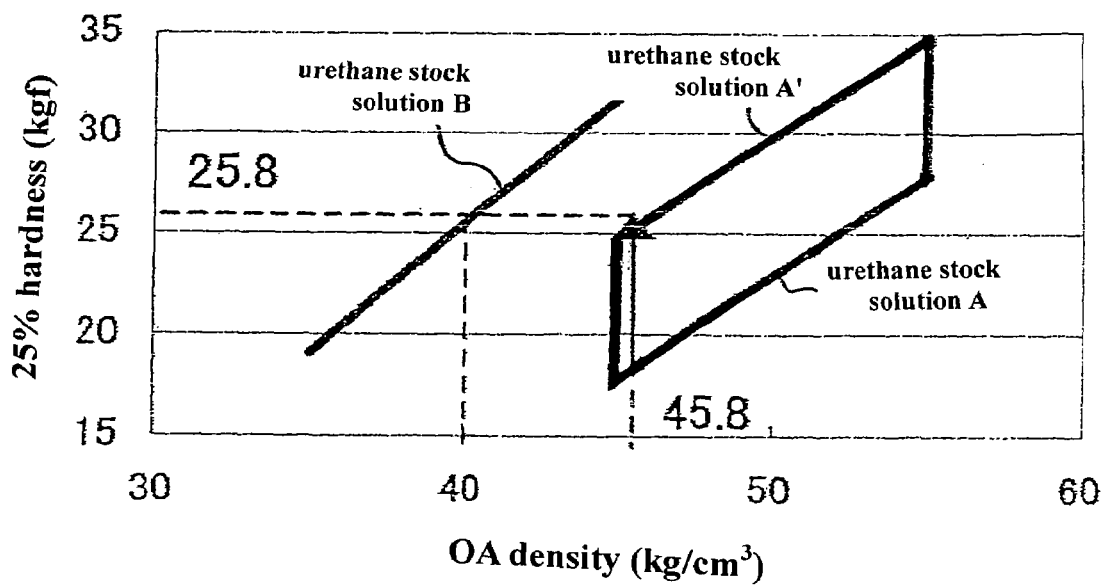
FIG. 3B is a graph showing the relationship between the OA density and the 25% hardness with respect to the urethane stock solution A, urethane stock solution A', and the urethane stock solution B in Example 1.

With respect to each of the urethane stock solution A and the urethane stock solution B, the relationship between the OA density and 25% hardness was investigated. FIG. 3B shows the results. As is clear from FIG. 3B, in the polyurethane foam segment formed with the urethane stock solution B, when the OA density was 40 kg/m³, the 25% hardness was 25.8 kgf. In the polyurethane foam segment formed with the urethane stock solution A, when the OA density was 45.8 kg/m³, the 25% hardness was 18 kgf. This hardness was significantly lower than 25.8 kgf described above.

With respect to the urethane stock solution A, the relationship between the OA density and the 25% hardness was investigated by gradually changing the mixing ratio of the polyol-containing solution to the isocyanate component. As shown in FIG. 3B, it was found that, in the polyurethane foam segment formed with a urethane stock solution A' having an isocyanate index of 37.5, when the OA density was 45.8 kg/m³, the 25% hardness was the same 25.8 kgf as that described above. Furthermore, the relationship between the OA density and the maximum internal pressure of the polyurethane foam segment formed with the urethane stock solution A' was substantially equivalent to that of the polyurethane foam segment formed with the urethane stock solution A. When the OA density was 45.8 kg/m³, each maximum internal pressure was 0.647 kg/cm².

Consequently, the urethane stock solution A' and the urethane stock solution B were used for forming a polyurethane foam segment. The polyurethane foam segment included a first molded portion having a high density and a second molded portion having a low density, the first and second molded portions each having a 25% hardness of 25.8 kgf. The first and second molded portions each had a volume of 8,000 cm³. The volume of the cavity of a mold for molding was 16,000 cm³. The amounts of urethane stock solutions injected were determined so that the maximum internal pressure in the cavity was 0.647 kg/cm² at any position in the cavity during molding.

TABLE 3

| | OA density (kg/m³) | 25% Hardness (kgf) | Internal pressure (kg/cm²) |
|---|---|---|---|
| High-density urethane stock solution A' | 45.8 | 25.8 | 0.647 |
| Low-density urethane stock solution B | 40 | 25.8 | 0.647 |

That is, from the OA density of the polyurethane foam segment formed with the urethane stock solution A' and the OA density the polyurethane foam segment formed with the urethane stock solution B, the volume of the high-density portion formed with the urethane stock solution A', and the volume of the low-density portion formed with the urethane stock solution B, the amounts of urethane stock solution A' and urethane stock solution B injected were determined the following so that the internal pressure was 0.647 kg/cm² (63.4 kPa) at any portion in one-piece molding.

The volume of a molding cavity A' in the mold was 8,000 cm³. The volume of a molding cavity B in the mold was also 8,000 cm³. The amount of urethane stock solution A' injected into the molding cavity A' was calculated by the following equation:

$$45.8 \ (kg/m^3) \times 8000 \times 10^{-6} \ (m^3) = 0.3664 \ kg$$

The amount of urethane stock solution B injected into the molding cavity B was calculated by the following equation:

$$40 \ (kg/m^3) \times 8000 \times 10^{-6} \ (m^3) = 0.3200 \ kg$$

The urethane stock solution A' and the urethane stock solution B were injected into the mold in the above-described amounts at the same time and were then foamed, thereby molding a polyurethane foam product including a high=density portion and a low-density portion as shown in FIG. 1A. The 25% hardness of the resulting polyurethane foam product was about 25.8 kgf (252.8 N) at any portion. The OA density of the high-density portion was 45.8 kg/m³, and the OA density of the low-density portion was 40 kg/m³.

The impact resilience of the polyurethane foam product was 62% at the high-density portion and the low-density portion.

Example 2

The foam molding was performed as in Example 1 except that the urethane stock solution A' and the urethane stock solution B were injected into the mold with a time difference. That is, the urethane stock solution A' was charged 7, 12, or 20 seconds after the injection of the urethane stock solution B. As shown in FIG. 1B, the interface L was formed in a curved line. In the same way as for the simultaneous injection, a polyurethane foam product having the following characteristics was molded: the 25% hardness was about 25.8 kgf at any portion. The OA density of a high-density portion was 45.8 kg/m³, and the OA density of a low-density portion was 40 kg/m³.

The impact resilience of the polyurethane foam product was 62% at the high-density portion and the low-density portion.

One-piece molding was performed as in Example 1 except that the urethane stock solution A was used instead of the urethane stock solution A'. As a result, a polyurethane foam product including a high-density portion formed with the urethane stock solution A and a low-density portion formed with the urethane stock solution B, was molded, the high-density portion having a 25% hardness of 17.8 kgf (174.4 N) and an OA density of 45.8 kg/m³, the low-density portion having a 25% hardness of 25.8 kgf (252.8 N} and an OA density of 40 kg/m³.

As described above, according to the present invention, a one-piece polyurethane foam product partly having different physical characteristics can be easily and surely molded. In a method for molding one-piece polyurethane foam product according to the present invention, a seat pad for a vehicle including an under-buttocks section affecting sitting comfort, riding comfort, and durability and the other sections little affecting sitting comfort, riding comfort, and durability, can be easily produced, the other sections being composed of a low-density, inexpensive material having substantially the same hardness as that of a material constituting the under-buttocks section. Therefore, according to the seat pad for a vehicle, reductions in the weight and material cost of the seat pad for a vehicle can be achieved without deterioration of sitting comfort, riding comfort, and durability.

What is claimed is:

1. A method for molding a one-piece polyurethane foam product, the product comprising at least two molded portions having different physical characteristics, the method comprising:

injecting at least two urethane stock solutions capable of forming polyurethane foam segments having different physical characteristics into a mold, each of the urethane stock solutions comprising a polyol-containing solution and an isocyanate component; and foaming the urethane stock solutions at a predetermined molding pressure P, wherein the at least two urethane stock solutions are injected into the mold and foamed so that any molded portion has the predetermined molding pressure P during foaming based on a maximum internal pressure and volumes of molded portions formed with the respective urethane stock solutions.

2. The method for molding the polyurethane foam product according to claim 1, wherein the one-piece polyurethane foam product comprising a first molded portion having a predetermined density and a second molded portion having a density different from that of the first molded portion is molded by injecting at least two urethane stock solutions capable of forming polyurethane foam segments having different densities into the mold and then foaming the urethane stock solutions at the predetermined molding pressure P.

3. The method for molding the one-piece polyurethane foam product according to claim 2, wherein the amounts of urethane stock solutions injected are determined so that any molded portion has the predetermined molding pressure P during foaming, based on the densities of the polyurethane foam segments formed with the urethane stock solutions at the predetermined molding pressure and the volumes of molded portions formed with the respective urethane stock solutions.

4. The method for molding the one-piece polyurethane foam product according to claim 2, wherein the one piece polyurethane foam product comprising the first molded portion having a predetermined hardness and density and the second molded portion having a density different from that of the first molded portion and having substantially the same hardness as that of the first molded portion is molded by injecting at least two urethane stock solutions capable of forming polyurethane form segments having different densities and substantially the same hardness into the mold and then foaming the urethane stock solutions at the predetermined molding pressure P.

5. The method for molding the one-piece polyurethane foam product according to claim 1, wherein the at least two urethane stock solutions are injected into the mold at the same time.

6. The method for molding the one-piece polyurethane foam product according to claim 1, wherein the at least two urethane stock solutions are injected into the mold with a time difference.

7. The method for molding the one-piece polyurethane foam product according to claim 1, wherein the molded polyurethane foam product is a seat pad for a vehicle.

8. A molded polyurethane foam product produced by the method according to claim 1.

9. A seat pad for a vehicle produced by the method according to claim 1.

10. The seat pad for the vehicle according to claim 9, said seat pad having a first molded portion consisting of an under-buttocks section and a second molded portion consisting of portions other than the under-buttocks section of a seating portion of the seat pad, wherein the second molded portion partly or wholly have a density lower than that of the under-buttocks section and has substantially the same hardness as that of the under-buttocks section.

11. The seat pad for the vehicle according to claim 10, wherein a density of the second molded portion is 40 percent to 95 percent of a density of the first molded portion.

12. The seat pad for the vehicle according to claim 10, wherein a volume of first molded portion comprises 20 percent to 70 percent of a total volume of the one-piece polyurethane product.

13. The seat pad for the vehicle according to claim 10, wherein a 25% hardness of the first molded portion is 150 to 300 N.

14. The method for molding the one piece polyurethane foam product according to claim 1, wherein the hardness of each portion is adjusted by adjusting an isocyanate index of a urethane solution for forming thereof.

15. The molded polyurethane product according to claim 8, wherein the product has an interface between the molded portions being substantially in the same plane.

* * * * *